(12) United States Patent
Xiao et al.

(10) Patent No.: US 10,642,822 B2
(45) Date of Patent: May 5, 2020

(54) RESOURCE COORDINATION METHOD, APPARATUS, AND SYSTEM FOR DATABASE CLUSTER

(71) Applicant: Huawei Technologies Co., Ltd., Shenzhen (CN)

(72) Inventors: Yulei Xiao, Shenzhen (CN); Tao Ye, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 539 days.

(21) Appl. No.: 15/639,675

(22) Filed: Jun. 30, 2017

(65) Prior Publication Data

US 2017/0308567 A1 Oct. 26, 2017

Related U.S. Application Data

(63) Continuation of application No. PCT/CN2016/070052, filed on Jan. 4, 2016.

(30) Foreign Application Priority Data

Jan. 4, 2015 (CN) .......................... 2015 1 0003943

(51) Int. Cl.
*G06F 16/00* (2019.01)
*G06F 16/23* (2019.01)
(Continued)

(52) U.S. Cl.
CPC ............ *G06F 16/2365* (2019.01); *G06F 3/06* (2013.01); *G06F 11/2043* (2013.01);
(Continued)

(58) Field of Classification Search
CPC .. G06F 16/2365; G06F 16/27; G06F 16/2358; G06F 3/06; G06F 11/2043;
(Continued)

(56) References Cited

U.S. PATENT DOCUMENTS

2004/0205057 A1* 10/2004 Hutchison ........... G06F 16/2471
2009/0144750 A1* 6/2009 Little .................... G06F 13/385
719/313
(Continued)

FOREIGN PATENT DOCUMENTS

CN 101778002 A 7/2010
CN 102591679 A 7/2012
(Continued)

OTHER PUBLICATIONS

Yousif, M., et al., "Shared-storage clusters," XP000964530, Cluster Computing 2, vol. 2, No. 4, Jan. 1999, p. 249-257.
(Continued)

*Primary Examiner* — Jared M Bibbee
(74) *Attorney, Agent, or Firm* — Conley Rose, P.C.

(57) ABSTRACT

A resource coordination method, an apparatus, and a system for a database cluster, which include an active coordinator node obtains status information corresponding to each processing node in multiple processing nodes, where the status information is used to indicate an operating load status of the processing node, determines, according to the status information corresponding to each processing node in multiple processing nodes, whether the active coordinator node has an idle resource whose capacity is a preset threshold X, and if the active coordinator node has the idle resource whose capacity is the preset threshold X, instructs each processing node to upload subsequently generated clean page data to the active coordinator node.

20 Claims, 7 Drawing Sheets

(51) Int. Cl.
*G06F 11/34* (2006.01)
*G06F 3/06* (2006.01)
*G06F 11/30* (2006.01)
*G06F 11/20* (2006.01)
*G06F 16/27* (2019.01)

(52) U.S. Cl.
CPC ...... *G06F 11/3006* (2013.01); *G06F 11/3433* (2013.01); *G06F 16/2358* (2019.01); *G06F 16/27* (2019.01); *G06F 2201/81* (2013.01); *G06F 2201/885* (2013.01)

(58) Field of Classification Search
CPC .............. G06F 11/3006; G06F 11/3433; G06F 2201/81; G06F 2201/885
See application file for complete search history.

(56) References Cited

U.S. PATENT DOCUMENTS

| | | | | |
|---|---|---|---|---|
| 2010/0023564 | A1* | 1/2010 | Yerneni | G06F 11/1662 707/E17.007 |
| 2011/0228668 | A1* | 9/2011 | Pillai | G06F 11/2023 370/217 |
| 2013/0117526 | A1* | 5/2013 | Florendo | G06F 3/0622 711/171 |
| 2014/0019405 | A1* | 1/2014 | Borthakur | G06F 16/182 707/609 |
| 2014/0046998 | A1* | 2/2014 | Dain | H04L 67/10 709/201 |
| 2015/0278030 | A1* | 10/2015 | Zhu | G06F 11/2097 707/623 |

FOREIGN PATENT DOCUMENTS

| | | | |
|---|---|---|---|
| CN | 103023970 | A | 4/2013 |
| CN | 103365987 | A | 10/2013 |
| CN | 104239227 | A | 12/2014 |
| CN | 104462225 | A | 3/2015 |
| CN | 104504147 | A | 4/2015 |

OTHER PUBLICATIONS

Das, S., et al., "Live Database Migration for Elasticity in a Multitenant Database for Cloud Platforms," XP055030999, UCSB Computer Science Technical Report, Sep. 2010, 14 pages.
Das, S., et al., "Albatross: Lightweight Elasticity in Shared Storage Databases for the Cloud using Live Data Migration," XP055126135, Proceedings of the VLDB Endowment, vol. 4, No. 8, Aug. 29, 2011, pp. 494-505.
Carey, M., et al., "Data Caching Tradeoffs in Client-Server DBMS Architectures," XP058191689, Management of Data, ACM, Apr. 1991, pp. 357-366.
Foreign Communication From a Counterpart Application, European Application No. 16732876.4, Extended European Search Report dated Nov. 3, 2017, 7 pages.
Machine Translation and Abstract of Chinese Publication No. CN104462225, Mar. 25, 2015, 26 pages.
Machine Translation and Abstract of Chinese Publication No. CN103365987, Oct. 23, 2013, 10 pages.
Machine Translation and Abstract of Chinese Publication No. CN103023970, Apr. 3, 2013, 15 pages.
Machine Translation and Abstract of Chinese Publication No. CN104504147, Part 1, Apr. 8, 2015, 22 pages.
Machine Translation and Abstract of Chinese Publication No. CN104504147, Part 2, Apr. 8, 2015, 8 pages.
Foreign Communication From a Counterpart Application, Chinese Application No. 201510003943.4, Chinese Search Report dated May 11, 2017, 2 pages.
Foreign Communication From a Counterpart Application, Chinese Application No. 201510003943.4, Chinese Office Action dated May 25, 2017, 3 pages.
Foreign Communication From a Counterpart Application, PCT Application No. PCT/CN2016/070052, English Translation of International Search Report dated Apr. 1, 2016, 2 pages.
Foreign Communication From a Counterpart Application, PCT Application No. PCT/CN2016/070052, English Translation of Written Opinion dated Apr. 1, 2016, 8 pages.

* cited by examiner

RESOURCE COORDINATION METHOD, APPARATUS, AND SYSTEM FOR DATABASE CLUSTER

CROSS-REFERENCE TO RELATED APPLICATIONS

This application is a continuation of International Application No. PCT/CN2016/070052, filed on Jan. 4, 2016, which claims priority to Chinese Patent Application No. 201510003943.4, filed on Jan. 4, 2015. The disclosures of the aforementioned applications are hereby incorporated by reference in their entireties.

TECHNICAL FIELD

The present application relates to the field of computer technologies, and specifically, to a resource coordination method, an apparatus, and a system for a database cluster.

BACKGROUND

In a cluster shared disk architecture, all servers in a cluster share a storage. Generally, servers in a cluster may be classified into processing nodes and coordinator nodes according to functions. Generally, there are multiple processing nodes, which are configured to execute specific functions, for example, execute a specific structured query language (SQL) program and a specific transaction. When database performance needs to be improved, an overall cluster computing capability may be improved by adding a processing node for horizontal scaling. In addition, all processing nodes are mutually redundant, so that a failure of a single processing node does not affect another processing node. Generally, there is only one coordinator node, which is configured to coordinate a contended common resource during concurrent execution of multiple processing nodes.

An existing typical example of the cluster shared disk architecture is an Oracle® Real Application Clusters (RAC) solution. In that solution, processing nodes are directly interconnected by using a high-speed private network. Resources on all the processing nodes may be mutually shared and accessed. Concurrence is controlled by using a data manipulation language (DML) mechanism. The DML mechanism refers to a data lock, and is used to protect data integrity. A coordinator node in an existing technical solution (for example, Oracle® RAC) mainly implements coordination of a common resource contended by different nodes, without consideration of sharing of storage space on the coordinator node. Consequently, in a read-only or read-more-write-less scenario, data cached by a coordinator node is extremely limited. As a result, storage space on the coordinator node and a high-speed communication feature of InfiniBand® (a communication interface between the coordinator node and a processing node) cannot be fully used. This is a waste. In this way, in a scenario such as restarting of a processing node after a failure, or addition of a new processing node, a resource can be obtained only from a disk array instead of a high-speed coordinator node. Efficiency is low because a processing node cannot be preheated rapidly.

SUMMARY

To resolve a prior-art problem that a resource cannot be rapidly obtained from a high-speed coordinator node in a scenario such as restarting a processing node after a failure, or adding a new node, and consequently efficiency is low because a processing node cannot be rapidly preheated, embodiments of the present application provide a resource coordination method for a database cluster, so as to fully use an idle resource on a coordinator node, so that more data generated by a processing node can be stored in the coordinator node. In this way, an idle resource on a coordinator node and a high-speed communication feature of InfiniBand are fully used, so that the processing node can be more rapidly and efficiently started. The embodiments of the present application further provide a corresponding apparatus and a corresponding system.

According to a first aspect, an embodiment of the present application provides a resource coordination method for a database cluster, where the database cluster includes multiple processing nodes and one active coordinator node, and the method includes obtaining status information corresponding to each processing node in the multiple processing nodes, where the status information is used to indicate an operating load status of the processing node, and determining, according to the status information corresponding to each processing node in the multiple processing nodes, whether the active coordinator node has an idle resource whose capacity is a preset threshold X, and if the active coordinator node has the idle resource whose capacity is the preset threshold X, instructing each processing node to upload subsequently generated clean page data to the active coordinator node, or determining, according to the status information corresponding to each processing node in the multiple processing nodes, whether each processing node in the multiple processing nodes is to upload dirty page data whose data volume is less than the preset threshold X within a preset time period, and if each processing node in the multiple processing nodes is to upload the dirty page data whose data volume is less than the preset threshold X within the preset time period, instructing each processing node to upload subsequently generated clean page data to the active coordinator node.

With reference to the first aspect, in a first possible implementation manner of the first aspect, after the instructing each processing node to upload subsequently generated clean page data to the active coordinator node, the method further includes monitoring the idle resource of the active coordinator node in real time, and when the capacity of the idle resource of the active coordinator node is less than a preset threshold Z, instructing each processing node not to upload the generated clean page data to the active coordinator node any more, where Z is less than X.

With reference to the first possible implementation manner of the first aspect, in a second possible implementation manner of the first aspect, after the instructing each processing node not to upload the generated clean page data to the active coordinator node any more, the method further includes, if the active coordinator node receives newly generated dirty page data, preferably removing the clean page data cached on the active coordinator node.

With reference to the first possible implementation manner of the first aspect, in a third possible implementation manner of the first aspect, after the instructing each processing node not to upload the generated clean page data to the active coordinator node any more, the method further includes, if the active coordinator node receives newly generated dirty page data, and a data volume of the newly generated dirty page data is greater than a data volume of the clean page data cached on the active coordinator node, preferably removing the clean page data cached on the active coordinator node, and storing the newly generated dirty page data in a storage device of the database cluster.

With reference to the first aspect, in a fourth possible implementation manner of the first aspect, after the determining, according to the status information corresponding to each processing node in the multiple processing nodes, whether each processing node in the multiple processing nodes is to upload dirty page data whose data volume is less than the preset threshold X within a preset time period, and if each processing node in the multiple processing nodes is to upload the dirty page data whose data volume is less than the preset threshold X within the preset time period, the method further includes generating a cache policy of the active coordinator node according to the status information corresponding to each processing node in the multiple processing nodes, where the cache policy of the active coordinator node includes a policy for uploading clean page data by each processing node in the multiple processing nodes to the active coordinator node.

Correspondingly, the instructing each processing node to upload subsequently generated clean page data to the active coordinator node includes instructing each processing node to upload the subsequently generated clean page data to the active coordinator node according to the cache policy of the active coordinator node.

With reference to the fourth possible implementation manner of the first aspect, in a fifth possible implementation manner of the first aspect, the generating a cache policy of the active coordinator node according to the status information corresponding to each processing node in the multiple processing nodes includes calculating, according to the status information corresponding to each processing node in the multiple processing nodes, a proportion of dirty page data generated by each processing node in the multiple processing nodes in a current unit of time, and generating the cache policy of the active coordinator node according to the proportion of the dirty page data generated by each processing node in the current unit of time.

With reference to the fifth possible implementation manner of the first aspect, in a sixth possible implementation manner of the first aspect, the status information includes a quantity of transactions executed by the processing node corresponding to the status information in a unit of time (TS), a read/write (R/M) proportion, a central processing unit (CPU) utilization ratio (CP), an input/output (I/O) utilization ratio (IP), and a data volume of dirty page data generated in a unit of time (DS).

With reference to the sixth possible implementation manner of the first aspect, in a seventh possible implementation manner of the first aspect, the calculating, according to the status information corresponding to each processing node in the multiple processing nodes, a proportion of dirty page data generated by each processing node in the multiple processing nodes in a current unit of time includes:

$$T = \frac{DS}{\frac{TWS}{JP} * QW} = \frac{DS*(R+W)*(Q1*CP+Q2*IP)}{TS*W*QW}$$

where TWS=(TS*W)/(R+W), JP=Q1*CP+Q2*IP, QW is a weighted value of dirty page data generated during a write transaction, Q1 is a weighted value of the CPU utilization ratio, Q2 is a weighted value of the I/O utilization ratio, and Q1+Q2≤1.

According to a second aspect, an embodiment of the present application provides an active coordinator node applied to a database cluster, where the active coordinator node includes an obtaining module configured to obtain status information corresponding to each processing node in multiple processing nodes in the database cluster, where the status information is used to indicate an operating load status of the processing node, a first determining module configured to determine, according to the status information corresponding to each processing node in the multiple processing nodes, whether the active coordinator node has an idle resource whose capacity is a preset threshold X, and an execution module configured to, when a determining result of the first determining module is a yes, instruct each processing node to upload subsequently generated clean page data to the active coordinator node.

With reference to the second aspect, in a first possible implementation manner of the second aspect, the active coordinator node further includes a second determining module configured to, when a determining result of the first determining module is a yes, determine, according to the status information corresponding to each processing node in the multiple processing nodes, whether each processing node in the multiple processing nodes is to upload dirty page data whose data volume is less than the preset threshold X within a preset time period.

Correspondingly, the execution module is configured to, when a determining result of the second determining module is a yes, instruct each processing node to upload subsequently generated clean page data to the active coordinator node.

With reference to the second aspect or the first possible implementation manner of the second aspect, in a second possible implementation manner of the second aspect, the active coordinator node further includes a monitoring module configured to monitor the idle resource of the active coordinator node in real time. When the capacity of the idle resource of the active coordinator node is less than a preset threshold Z, the execution module instructs each processing node not to upload the generated clean page data to the active coordinator node any more, where Z is less than X.

With reference to the second possible implementation manner of the second aspect, in a third possible implementation manner of the second aspect, after the execution module instructs each processing node not to upload the generated clean page data to the active coordinator node any more, and if the active coordinator node receives newly generated dirty page data, the execution module is further configured to preferably remove the clean page data cached on the active coordinator node.

With reference to the second possible implementation manner of the second aspect, in a fourth possible implementation manner of the second aspect, after the execution module instructs each processing node not to upload the generated clean page data to the active coordinator node any more, and if the active coordinator node receives newly generated dirty page data, and a data volume of the newly generated dirty page data is greater than a data volume of the clean page data cached on the active coordinator node, the execution module is further configured to preferably remove the clean page data cached on the active coordinator node, and store the newly generated dirty page data in a storage device of the database cluster.

With reference to the first possible implementation manner of the second aspect, in a fifth possible implementation manner of the second aspect, when a determining result of the second determining module is a yes, the active coordinator node further includes a cache policy generation module configured to generate a cache policy of the active coordinator node according to the status information corresponding to each processing node in the multiple processing nodes, where the cache policy of the active coordinator node includes a policy for uploading clean page data by each processing node in the multiple processing nodes to the active coordinator node.

Correspondingly, the execution module is configured to instruct each processing node to upload subsequently generated clean page data to the active coordinator node according to the cache policy of the active coordinator node.

With reference to the fifth possible implementation manner of the second aspect, in a sixth possible implementation manner of the second aspect, the cache policy generation module is specifically configured to calculate, according to the status information corresponding to each processing node in the multiple processing nodes, a proportion of dirty page data generated by each processing node in the multiple processing nodes in a current unit of time, and generate the cache policy of the active coordinator node according to the proportion of the dirty page data generated by each processing node in the current unit of time.

According to a third aspect, an embodiment of the present application provides a database cluster, including multiple processing nodes and one active coordinator node. The active coordinator node obtains status information corresponding to each processing node in the multiple processing nodes, determines, according to the status information corresponding to each processing node in the multiple processing nodes, whether the active coordinator node has an idle resource whose capacity is a preset threshold X, and if the active coordinator node has the idle resource whose capacity is the preset threshold X, instructs each processing node to upload subsequently generated clean page data to the active coordinator node. The status information is used to indicate an operating load status of the processing node.

Each processing node receives an instruction sent by the active coordinator node, and when any one of the processing nodes generates clean page data, uploads the generated clean page data to the active coordinator node.

With reference to the third aspect, in a first possible implementation manner of the third aspect, the active coordinator node obtains the status information corresponding to each processing node in the multiple processing nodes, determines, according to the status information corresponding to each processing node in the multiple processing nodes, whether the active coordinator node has the idle resource whose capacity is the preset threshold X, if the active coordinator node has the idle resource whose capacity is the preset threshold X, further determines, according to the status information corresponding to each processing node in the multiple processing nodes, whether each processing node in the multiple processing nodes is to upload dirty page data whose data volume is less than the preset threshold X within a preset time period, and if each processing node in the multiple processing nodes is to upload the dirty page data whose data volume is less than the preset threshold X within the preset time period, instructs each processing node to upload subsequently generated clean page data to the active coordinator node.

Each processing node receives an instruction sent by the active coordinator node, and when any one of the processing nodes generates clean page data, uploads the generated clean page data to the active coordinator node.

With reference to the first possible implementation manner of the third aspect, in a second possible implementation manner of the third aspect, the active coordinator node determines whether each processing node in the multiple processing nodes is to upload the dirty page data whose data volume is less than the preset threshold X within the preset time period, and if each processing node in the multiple processing nodes is to upload the dirty page data whose data volume is less than the preset threshold X within the preset time period, generates a cache policy of the active coordinator node according to the status information corresponding to each processing node in the multiple processing nodes, and instructs each processing node to upload the subsequently generated clean page data to the active coordinator node according to the cache policy of the active coordinator node.

Correspondingly, each processing node receives the instruction sent by the active coordinator node, and when any one of the processing nodes generates clean page data, uploads the generated clean page data to the active coordinator node according to the cache policy of the active coordinator node.

With reference to the first possible implementation manner of the third aspect or the second possible implementation manner of the third aspect, in a third possible implementation manner of the third aspect, the database cluster further includes a standby coordinator node configured to back up data for the active coordinator node, so that content on the standby coordinator node is the same as content on the active coordinator node.

In the embodiments of the present application, whether an active coordinator node has an idle resource whose capacity is a preset threshold X is determined according to status information corresponding to each processing node in multiple processing nodes, and when a determining result is a yes, each processing node is instructed to upload newly generated clean page data to the active coordinator in following work. In this way, the idle resource on the active coordinator node is fully used. When a processing node is restarted or a new processing node is added, a resource can be rapidly obtained from the high-speed coordinator node. Storage space on the coordinator node and a high-speed communication feature of InfiniBand are fully used, so that the processing node can be rapidly preheated to improve work efficiency.

BRIEF DESCRIPTION OF DRAWINGS

To describe the technical solutions in the embodiments of the present application more clearly, the following briefly describes the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

Figure 1:
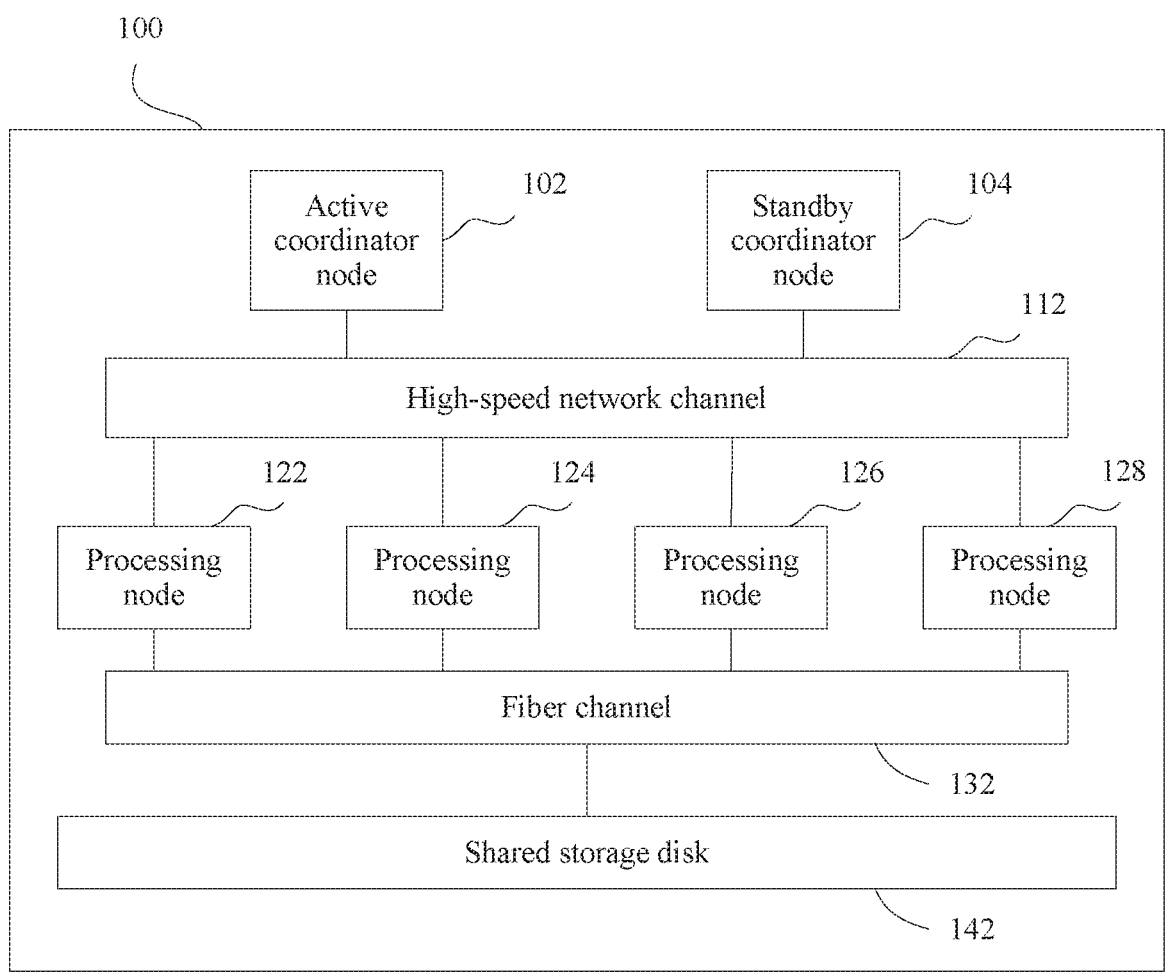
FIG. 1 is a hardware structure diagram of a database cluster according to an embodiment of the present application.

Embodiments of the present application provide a resource coordination method for a database cluster. Whether an active coordinator node has an idle resource whose capacity is a preset threshold X is determined according to status information corresponding to each processing node in multiple processing nodes. If the active coordinator node has the idle resource whose capacity is the preset threshold X, each processing node is instructed to upload subsequently generated clean page data to the active coordinator node. Storage space on the coordinator node and a high-speed communication feature of InfiniBand are fully used, so that the processing node can be rapidly preheated to improve work efficiency. The embodiments of the present application further provide a corresponding apparatus and a corresponding system. Details are separately illustrated in the following.

To make a person skilled in the art understand the technical solutions in the present application better, the following clearly describes the technical solutions in the embodiments of the present application with reference to the accompanying drawings in the embodiments of the present application. The described embodiments are merely a part rather than all of the embodiments of the present application. All other embodiments obtained by a person of ordinary skill in the art based on the embodiments of the present application without creative efforts shall fall within the protection scope of the present application.

A database cluster in the embodiments of the present application includes a processing node and an active coordinator node. Generally, the database cluster further includes a standby coordinator node configured to back up data of the active coordinator node, and take over work of the active coordinator node when the active coordinator node fails. Generally, there are multiple processing nodes, which are configured to execute specific functions, for example, execute a specific SQL program and a specific transaction. Generally, there is only one active coordinator node. Certainly, a possibility that multiple active coordinator nodes work together is not excluded. The active coordinator node is configured to coordinate a contended common resource during concurrent execution of the multiple processing nodes. A database cluster 100 shown in FIG. 1 may provide hardware support for the resource coordination method for a database cluster provided in the embodiments of the present application. The database cluster 100 includes an active coordinator node 102, a standby coordinator node 104, a high-speed network channel (for example, InfiniBand (IB)) 112, processing nodes 122, 124, 126, and 128, a fiber channel 132, and a shared storage disk 142. In an embodiment, the shared storage disk 142 stores data in the database cluster 100, and the processing nodes 122, 124, 126, and 128 execute specific transactions, and perform a calculation or read/write operation on the data stored in the shared storage disk 142. The active coordinator node 102 manages communication between the processing nodes 122, 124, 126, and 128. When the active coordinator node 102 fails, the standby coordinator node 104 replaces the active coordinator node 102 to complete functions of the active coordinator node 102 that is in a normal state. The high-speed network channel 112 is used for communication between the processing nodes 122, 124, 126, and 128, between the active coordinator node 102 and the standby coordinator node 104, and between the processing nodes 122, 124, 126, and 128 and each of the active coordinator node 102 and the standby coordinator node 104. The high-speed network channel may be an IB channel. The fiber channel 132 is used for communication between the processing nodes 122, 124, 126, and 128 and the shared storage disk 142. All of the active coordinator node 102, the standby coordinator node 104, and the processing nodes 122, 124, 126, and 128 may be specifically computers. Therefore, their internal hardware structures may be the same as or similar to a universal computer hardware structure. For example, each of them includes a processor and a memory, and may further include a hard disk (which may be referred to as an external storage). A resource coordination method, an apparatus, and a system for a database cluster that are provided in the following embodiments of the present application are implemented on such a hardware basis.

Embodiment 1

Figure 2:
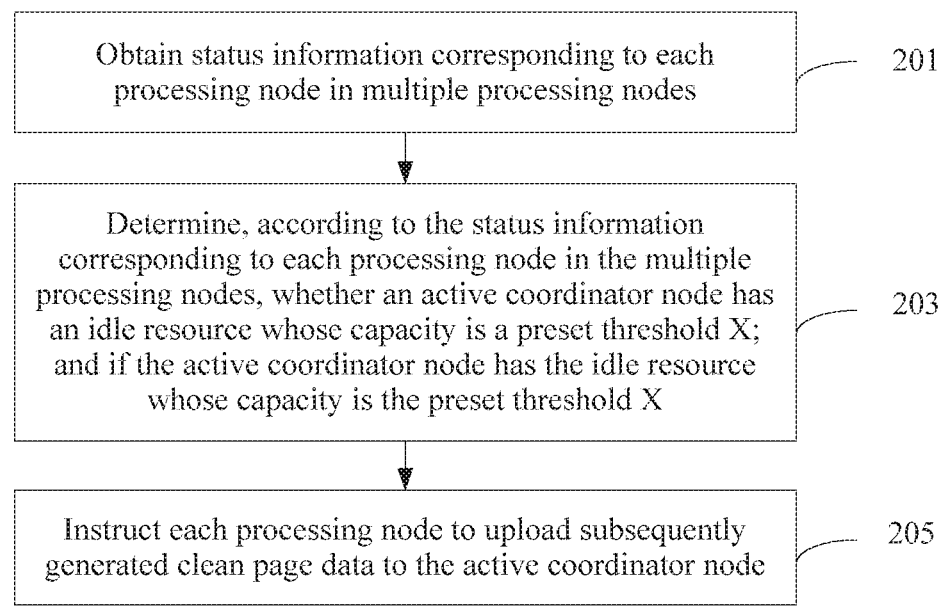
FIG. 2 is a flowchart of a resource coordination method for a database cluster according to an embodiment of the present application.

In Embodiment 1, FIG. 2 shows a flowchart of a resource coordination method for a database cluster according to an embodiment of the present application. It can be understood that the method may be implemented on the hardware basis of the database cluster 100 provided in FIG. 1.

In step 201, an active coordinator node obtains status information corresponding to each processing node in multiple processing nodes, where the status information herein is used to indicate an operating load status of the processing node corresponding to the status information.

It should be noted that, when the database cluster includes a standby coordinator node, to keep data consistency with the active coordinator node, the standby coordinator node, like the active coordinator node, may directly obtain, from the multiple processing nodes, information the same as the information obtained by the active coordinator node, or may obtain the information from the active coordinator node that has obtained the information. A following related part is the same as this, and details are not to be described again. It should be further noted that, the status information herein refers to a status such as a cache load, corresponding to each processing node, in a process of executing a specific transaction by each processing node, and includes but is not limited to data such as a quantity of transactions in a unit of time (TS), a read/write proportion (R/W), a CPU utilization ratio (CP), an IO utilization ratio (IP), and a data volume of dirty page data generated in a unit of time (DS).

In step 203, the active coordinator node determines, according to the status information corresponding to each processing node in the multiple processing nodes, whether the active coordinator node has an idle resource whose capacity is a preset threshold X.

The idle resource herein may refer to cache space on the active coordinator node. The cache space may refer to a memory of the active coordinator node, or may refer to storage space constituted by a memory and an external storage (that is, a storage component such as a hard disk) of the active coordinator node. The preset threshold X herein may be a threshold set based on an empirical value.

Based on the determining in step 203, step 205 is performed if a determining result is a yes.

In step 205, the active coordinator node instructs each processing node to upload subsequently generated clean page data to the active coordinator node.

That is, after it is determined that the active coordinator node has the idle resource whose capacity is the preset threshold X, each processing node is instructed to upload, to the active coordinator node, clean page data generated in a subsequent process of executing a specific transaction.

In the resource coordination method for a database cluster provided in this embodiment of the present application, operating statuses of multiple processing nodes are collected. Whether an active coordinator node has an idle resource is determined according to status information of each processing node. If the active coordinator node has the idle resource, the processing node is instructed to upload subsequently generated clean page data to the active coordinator node. Therefore, in addition to coordinating a resource contended by the processing nodes, the active coordinator node can fully use its remaining idle resource to assist the processing nodes in caching clean page data of a non-contended resource. In this way, when a processing node is restarted or a new processing node is added, a data resource may be rapidly obtained from the high-speed coordinator node. Storage space on the coordinator node and a high-speed communication feature of InfiniBand are fully used, so that the processing node can be rapidly preheated to improve work efficiency.

Figure 3:
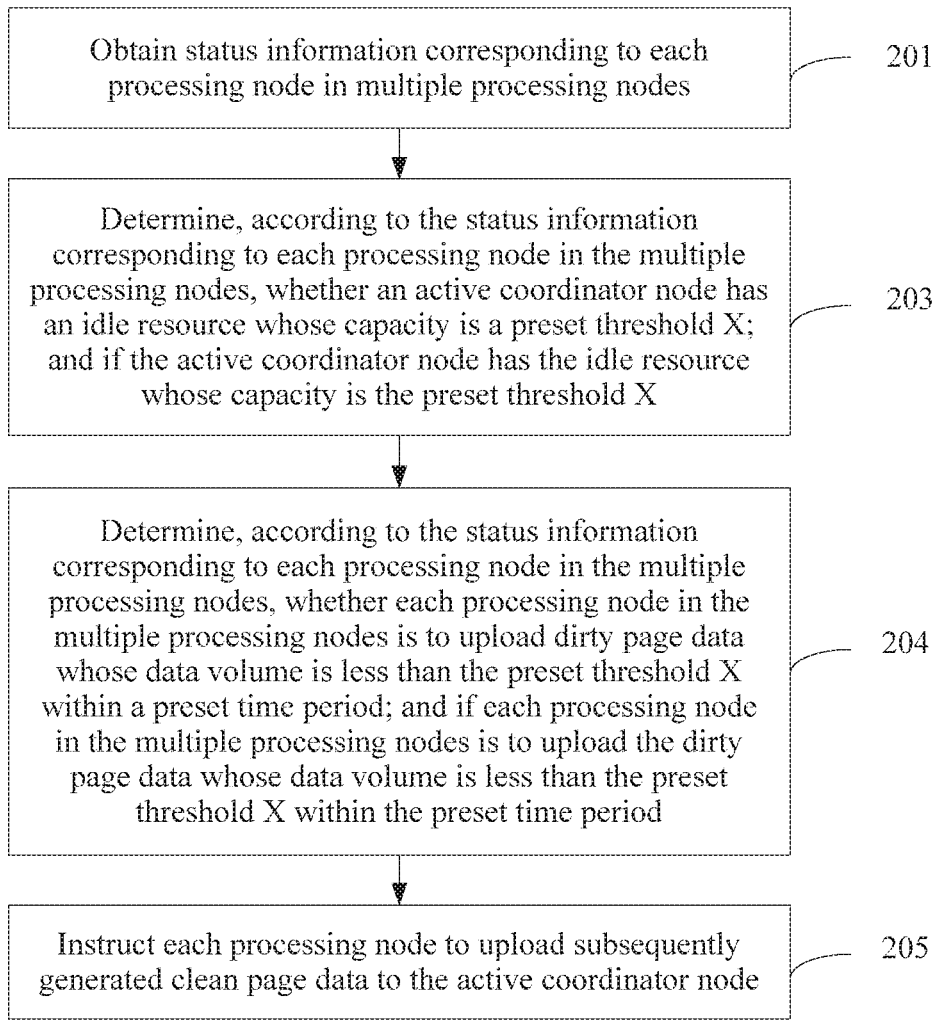
FIG. 3 is a flowchart of another resource coordination method for a database cluster according to an embodiment of the present application.

As shown in FIG. 3, based on FIG. 2, step 204 is added after the determining result in step 203 is determined as a yes.

In step 204, the active coordinator node determines, according to the status information corresponding to each processing node in the multiple processing nodes, whether each processing node in the multiple processing nodes is to upload dirty page data whose data volume is less than the preset threshold X within a preset time period.

It should be noted that the preset time period herein may be set according to an empirical value, and may be in a unit of hour or day, which is not limited herein.

When a determining result in step 204 is a yes, step 205 is further performed, that is, the active coordinator node instructs each processing node to upload subsequently generated clean page data to the active coordinator node.

After a determining action of step 204 is added, based on Embodiment 1, by means of two times of determining in step 203 and step 204, it is determined that the active coordinator node has the idle resource whose capacity is the preset threshold X and the data volume of the dirty page data to be uploaded by each processing node within the preset time period is less than the preset threshold X. In this case, it indicates that, within the preset time period, the active coordinator node still has an idle resource that may be used to accommodate the clean page data of the processing node. Therefore, availability of the idle resource on the active coordinator node is further ensured, so that the solution provided in this embodiment of the present application is more precisely applicable, and work efficiency of the processing node is further improved.

Figure 4:
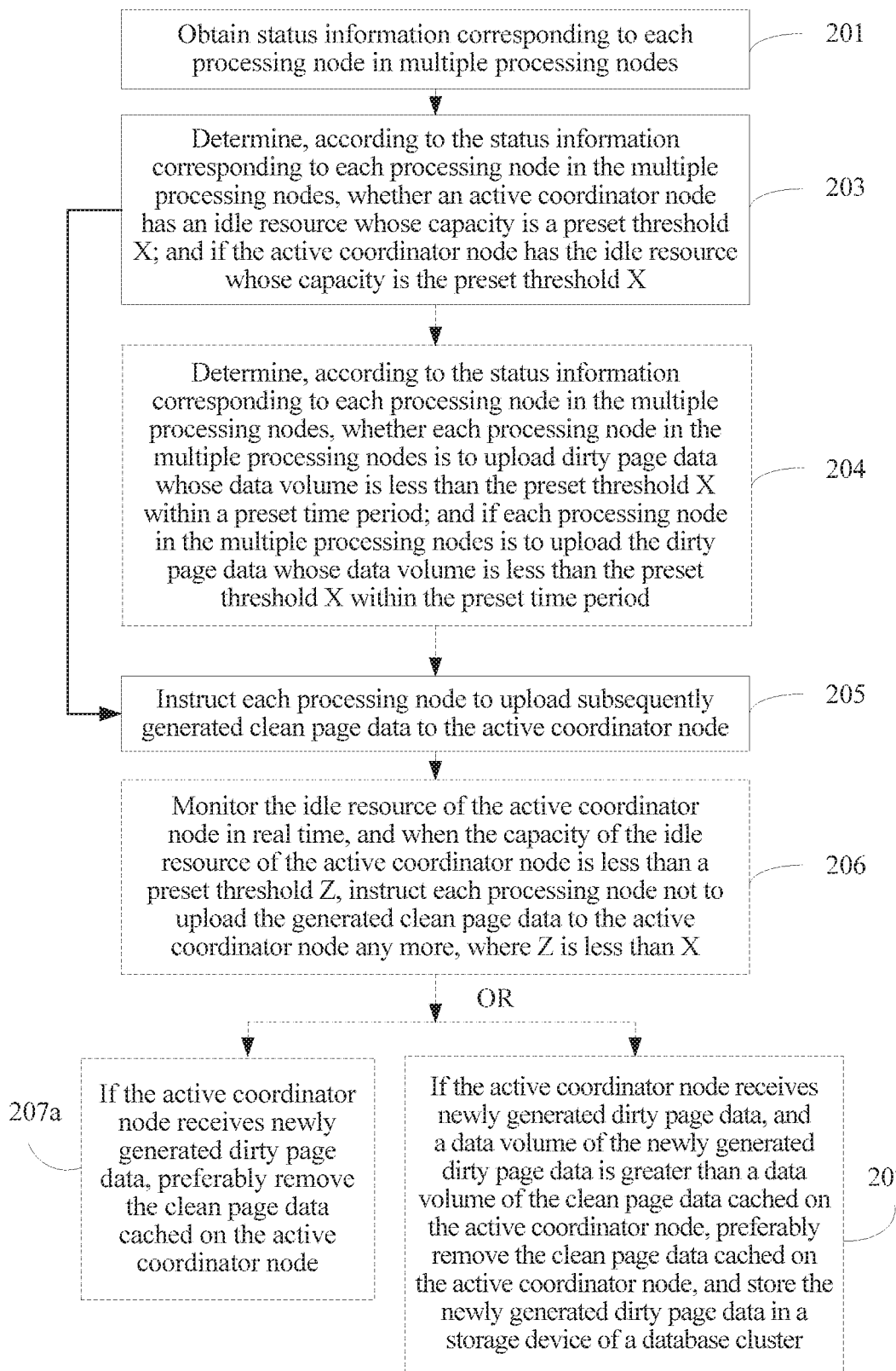
FIG. 4 is a flowchart of still another resource coordination method for a database cluster according to an embodiment of the present application.

As shown in FIG. 4, based on FIG. 3 and the foregoing embodiment, in an embodiment of the present application, step 206 may be further added after step 205.

In step 206, the active coordinator node monitors its own idle resource in real time, and when the capacity of its idle resource is less than a preset threshold Z, instructs each processing node not to upload the generated clean page data to the active coordinator node any more, where Z is less than X.

It should be noted that the preset threshold Z herein may be obtained according to an empirical value or a requirement of a hardware device. For example, Z may be 10% of total storage space on the active coordinator node. The total storage space herein may be a total memory space value of the active coordinator node, or may be a sum value of memory space and external storage space such as hard disk space on the active coordinator node. This is merely an example and constitutes no limitation herein.

Optionally, in another embodiment of the present application, step 207*a* is further added after step 206.

In step 207*a*, if the active coordinator node receives newly generated dirty page data, the active coordinator node preferably removes the clean page data cached on the active coordinator node.

Alternatively, in another embodiment of the present application, step 207*b* may be further added after step 206.

In step 207*b*, if the active coordinator node receives newly generated dirty page data, and a data volume of the newly generated dirty page data is greater than a data volume of the clean page data cached on the active coordinator node, the active coordinator node preferably removes the clean page data cached on the active coordinator node, and stores the newly generated dirty page data in a storage device of the database cluster.

Figure 5:
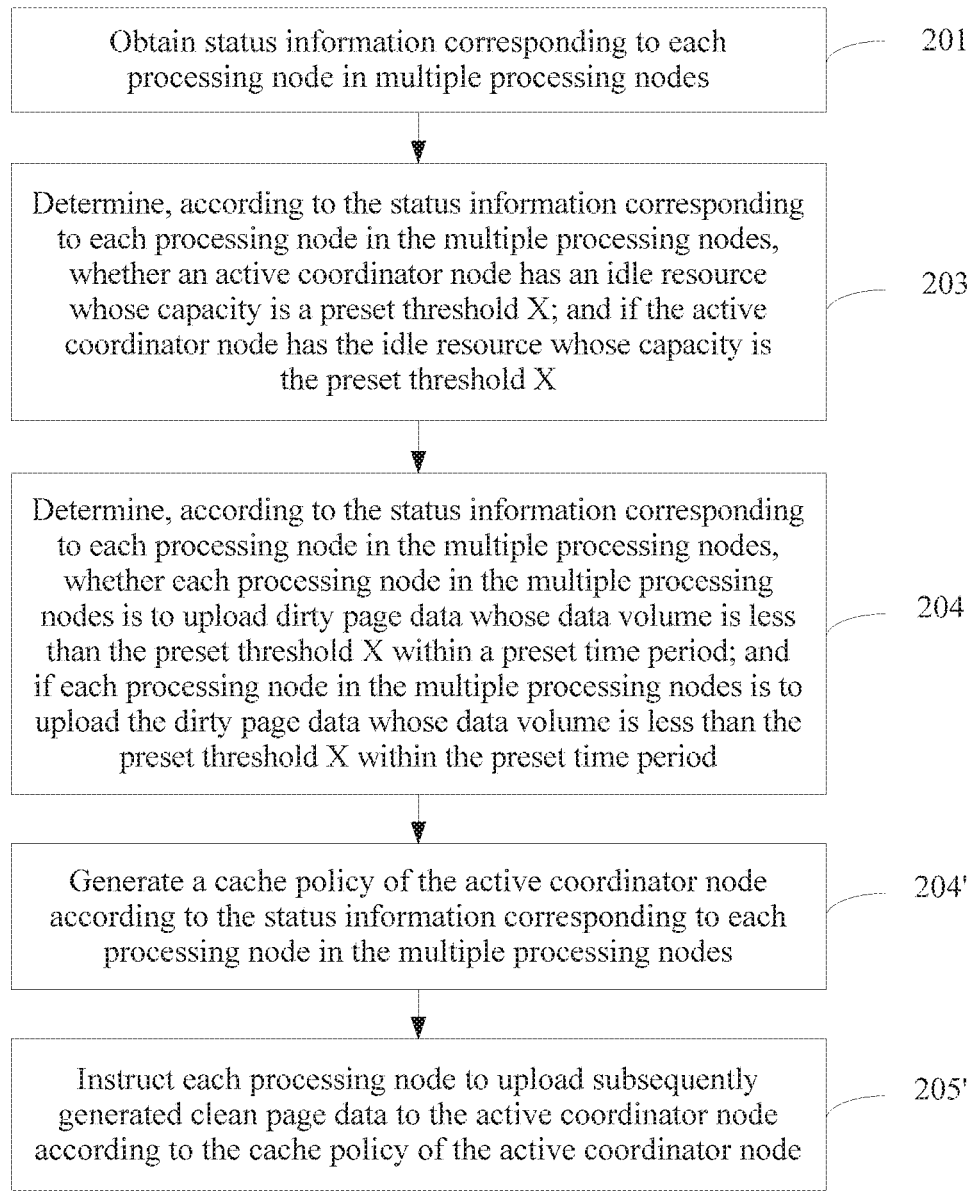
FIG. 5 is a flowchart of yet another resource coordination method for a database cluster according to an embodiment of the present application.

As shown in FIG. 5, based on FIG. 3, in still another embodiment of the present application, step 204' is further added based on a yes determined in step 204.

In step 204', a cache policy of the active coordinator node is generated according to the status information corresponding to each processing node in the multiple processing nodes, where the cache policy of the active coordinator node includes a policy for uploading clean page data by each processing node in the multiple processing nodes to the active coordinator node.

The cache policy may be an integrated policy formed by cache policies respectively corresponding to the processing nodes, and is used to instruct each processing node to upload the clean page data generated by each processing node to the active coordinator node. Both a cache time (when to start uploading and when to end the uploading) and a cached volume may be embodied in the cache policy.

Correspondingly, step 205 may be further step 205'.

In step 205', the active coordinator node instructs each processing node to upload subsequently generated clean page data to the active coordinator node according to the cache policy of the active coordinator node.

Optionally, there are many calculation methods for the foregoing cache policy. This embodiment of the present application provides a cache policy calculation method, which may be specifically calculating, according to the status information corresponding to each processing node in the multiple processing nodes, a proportion of dirty page data generated by each processing node in the multiple processing nodes in a current unit of time, and generating the cache policy of the active coordinator node according to the proportion of the dirty page data generated by each processing node in the current unit of time.

It should be noted that the status information herein refers to a status such as a cache load, corresponding to each processing node, in a process of executing a specific transaction by each processing node, and includes but is not limited to data such as a quantity of transactions in a unit of time (IS), a read/write proportion (R/W), a CPU utilization ratio (CP), an IO utilization ratio (IP), and a data volume of dirty page data generated in a unit of time (DS).

Further, optionally, the proportion of the ditty page data generated by the processing node in the current unit of time is T. A specific calculation method may be obtained according to the following method. Certainly, the following method is merely an optional method provided in this embodiment of the present application, and constitutes no limitation on this solution.

$$T = \frac{DS}{\frac{TWS}{JP} * QW} = \frac{DS * (R+W) * (Q1 * CP + Q2 * IP)}{TS * W * QW}$$

where TWS=(TS*W)/(R+W), JP=Q1*CP+Q2*IP, QW is a weighted value of dirty page data generated during a write transaction, Q1 is a weighted value of the CPU utilization ratio, Q2 is a weighted value of the I/O utilization ratio, and Q1+Q2≤1.

This embodiment of the present application provides a resource coordination method for a database cluster. In this embodiment of the present application, a cache policy of an active coordinator node is generated according to status information corresponding to each processing node in multiple processing nodes. In this way, the processing node can upload clean page data to the active coordinator node according to the cache policy, so that each processing node can upload clean page data to the active coordinator node in a targeted manner. Therefore, the solution provided in this embodiment of the present application is more precisely applicable, and work efficiency of the processing node is further improved.

Embodiment 2

Figure 6:
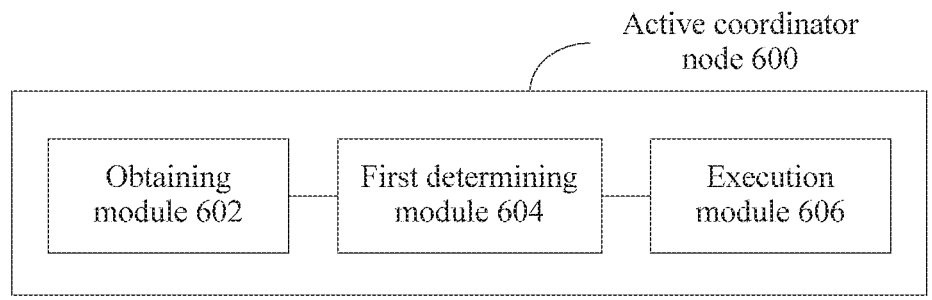
FIG. 6 is a schematic structural diagram of an active coordinator node applied to a database cluster according to an embodiment of the present application.

In Embodiment 2, as shown in FIG. 6, this embodiment of the present application provides an active coordinator node 600 applied to a database cluster. The active coordinator node 600 may run on a hardware basis of a database cluster 100 provided in FIG. 1. For example, the active coordinator node 600 may be n active coordinator node 102 in the database cluster 100.

The active coordinator node 600 includes an obtaining module 602 configured to obtain status information corresponding to each processing node in multiple processing nodes in the database cluster, where the status information is used to indicate an operating load status of the processing node, a first determining module 604 configured to determine, according to the status information corresponding to each processing node in the multiple processing nodes, whether the active coordinator node has an idle resource whose capacity is a preset threshold X, and an execution module 606 configured to, when a determining result of the first determining module is a yes, instruct each processing node to upload subsequently generated clean page data to the active coordinator node.

In the active coordinator node provided in this embodiment of the present application, an obtaining module 602 obtains status information of each processing node according to collected operating statuses of multiple processing nodes. The status information is used by a first determining module 604 to determine whether the active coordinator node has an idle resource. If the active coordinator node has the idle resource, an execution module 606 instructs the processing node to upload subsequently generated clean page data to the active coordinator node. Therefore, in addition to coordinating a resource contended by the processing nodes, the active coordinator node 600 can fully use its remaining idle resource to assist the processing nodes in caching clean page data of a non-contended resource. In this way, when a processing node is restarted or a new processing node is added, a data resource may be rapidly obtained from the high-speed coordinator node. Storage space on the active coordinator node and a high-speed communication feature of InfiniBand are fully used, so that the processing node can be rapidly preheated to improve work efficiency.

Figure 7:
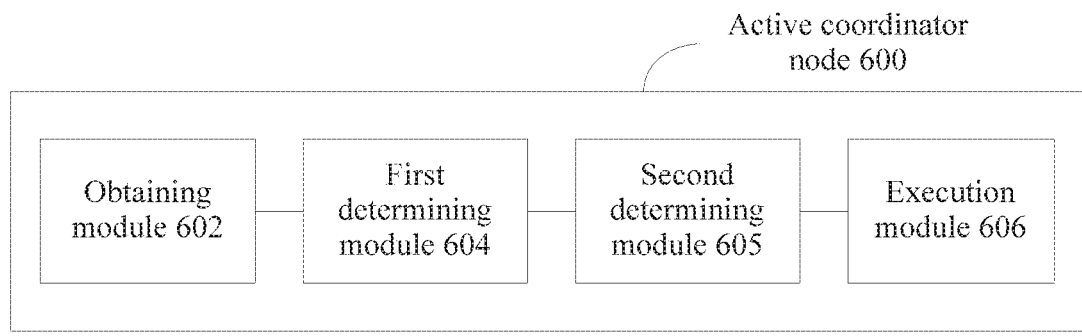
FIG. 7 is a schematic structural diagram of another active coordinator node applied to a database cluster according to an embodiment of the present application.

As shown in FIG. 7, based on the foregoing Embodiment 2, optionally, the active coordinator node 600 may further include a second determining module 605 configured to, when a determining result of the first determining module 604 is a yes, determine, according to the status information corresponding to each processing node in the multiple processing nodes, whether each processing node in the multiple processing nodes is to upload dirty page data whose data volume is less than the preset threshold X within a preset time period.

Correspondingly, the execution module 606 may be configured to, when a determining result of the second determining module 605 is a yes, instruct each processing node to upload subsequently generated clean page data to the active coordinator node.

Figure 8:
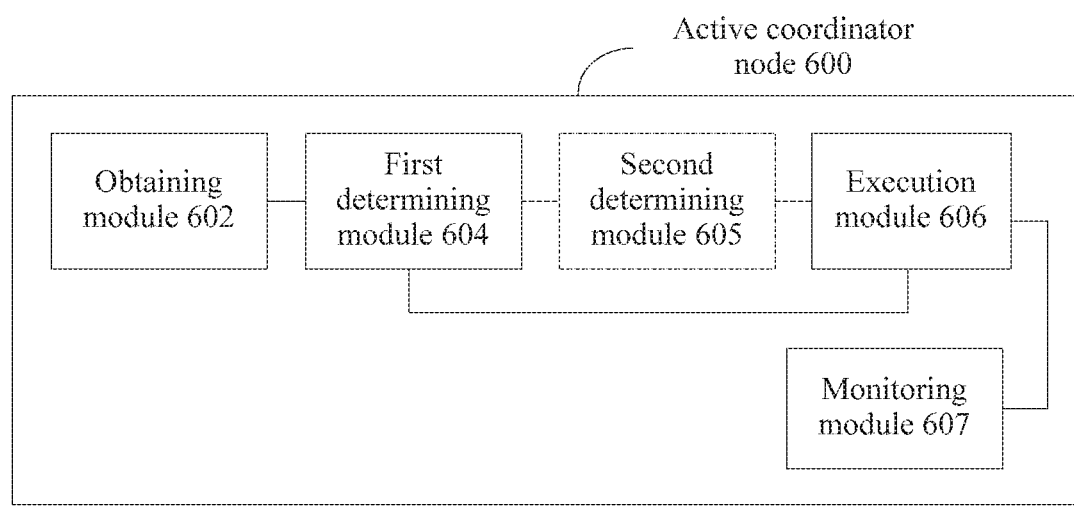
FIG. 8 is a schematic structural diagram of still another active coordinator node applied to a database cluster according to an embodiment of the present application.

As shown in FIG. 8, optionally, the active coordinator node 600 may further include a monitoring module 607 configured to monitor the idle resource of the active coordinator node in real time, and when the capacity of the idle resource of the active coordinator node is less than a preset threshold Z, the execution module instructs each processing node not to upload the generated clean page data to the active coordinator node any more, where Z is less than X.

After the execution module 606 instructs each processing node not to upload the generated clean page data to the active coordinator node any more, and if the active coordinator node 600 receives newly generated dirty page data, the execution module 606 is further configured to preferably remove the clean page data cached on the active coordinator node.

Alternatively, after the execution module 606 instructs each processing node not to upload the generated clean page data to the active coordinator node any more, and if the active coordinator node 600 receives newly generated dirty page data, and a data volume of the newly generated dirty page data is greater than a data volume of the clean page data cached on the active coordinator node 600, the execution module 606 is further configured to preferably remove the clean page data cached on the active coordinator node 600, and store the newly generated dirty page data in a storage device of the database cluster (for example, a shared storage disk 142 in the database cluster 100).

Figure 9:
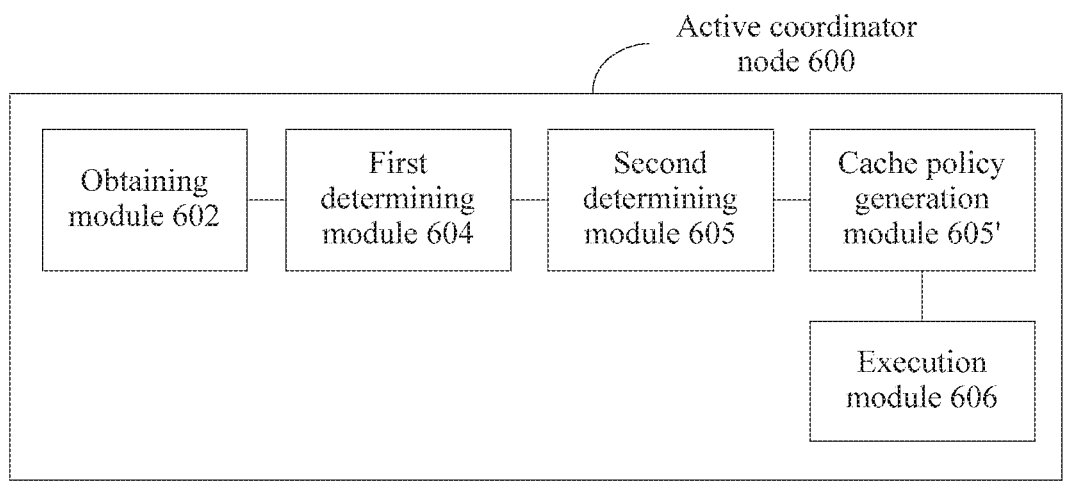
FIG. 9 is a schematic structural diagram of yet another active coordinator node applied to a database cluster according to an embodiment of the present application.

As shown in FIG. 9, based on the foregoing embodiment, the present application provides another embodiment. In this embodiment, the active coordinator node 600 further includes a cache policy generation module 605' configured to generate a cache policy of the active coordinator node 600 according to the status information corresponding to each processing node in the multiple processing nodes. The cache policy of the active coordinator node 600 includes a policy for uploading clean page data by each processing node in the multiple processing nodes to the active coordinator node 600.

Correspondingly, the execution module 606 is further configured to instruct each processing node to upload subsequently generated clean page data to the active coordinator node 600 according to the cache policy of the active coordinator node.

Further, optionally, the cache policy generation module 605' may be specifically configured to calculate, according to the status information corresponding to each processing node in the multiple processing nodes, a proportion of dirty page data generated by each processing node in the multiple processing nodes in a current unit of time, and generate the cache policy of the active coordinator node according to the proportion of the dirty page data generated by each processing node in the current unit of time.

Embodiment 3

In Embodiment 3, as shown in FIG. 1, based on a hardware device of the database cluster 100 in FIG. 1, this embodiment of the present application provides a database cluster, which includes multiple processing nodes such as 122, 124, 126, and 128 and one active coordinator node 102.

The active coordinator node 102 obtains status information corresponding to each processing node in the multiple processing nodes such as 122, 124, 126, and 128, and determines, according to the status information corresponding to each processing node in the multiple processing nodes, whether the active coordinator node 102 has an idle resource whose capacity is a preset threshold X. If the active coordinator node 102 has the idle resource whose capacity is the preset threshold X, the active coordinator node 102 instructs each processing node to upload subsequently generated clean page data to the active coordinator node 102. The status information is used to indicate an operating load status of the processing node.

Each processing node receives an instruction sent by the active coordinator node 102, and when any one of the processing nodes generates clean page data, uploads the generated clean page data to the active coordinator node 102.

Optionally, an embodiment of the present application further provides a database cluster, which includes multiple processing nodes such as 122, 124, 126, and 128 and one active coordinator node 102.

The active coordinator node 102 obtains status information corresponding to each processing node in the multiple processing nodes such as 122, 124, 126, and 128, and determines, according to the status information corresponding to each processing node in the multiple processing nodes, whether the active coordinator node 102 has an idle resource whose capacity is a preset threshold X. If the active coordinator node 102 has the idle resource whose capacity is the preset threshold X, the active coordinator node 102 further determines, according to the status information corresponding to each processing node in the multiple processing nodes, whether each processing node in the multiple processing nodes is to upload dirty page data whose data volume is less than the preset threshold X within a preset time period. If each processing node in the multiple processing nodes is to upload the dirty page data whose data volume is less than the preset threshold X within the preset time period, the active coordinator node 102 instructs each processing node to upload subsequently generated clean page data to the active coordinator node 102.

Each processing node receives an instruction sent by the active coordinator node 102, and when any one of the processing nodes generates clean page data, uploads the generated clean page data to the active coordinator node 102.

Optionally, based on the foregoing embodiment, an embodiment of the present application further provides another database cluster, which includes multiple processing nodes such as 122, 124, 126, and 128 and one active coordinator node 102.

The active coordinator node 102 determines whether each processing node in the multiple processing nodes such as 122, 124, 126, and 128 is to upload dirty page data whose data volume is less than a preset threshold X within a preset time period. If each processing node in the multiple processing nodes such as 122, 124, 126, and 128 is to upload the dirty page data whose data volume is less than the preset threshold X within the preset time period, the active coordinator node 102 generates a cache policy of the active coordinator node 102 according to status information corresponding to each processing node in the multiple processing nodes, and instructs each processing node to upload subsequently generated clean page data to the active coordinator node 102 according to the cache policy of the active coordinator node.

Correspondingly, each processing node receives an instruction sent by the active coordinator node 102, and when any one of the processing nodes generates clean page data, uploads the generated clean page data to the active coordinator node 102 according to the cache policy of the active coordinator node.

It should be noted that, as shown in FIG. 1, the database cluster may further include a standby coordinator node 104. The standby coordinator node 104 is configured to back up data for the active coordinator node 102, so that content on the standby coordinator node 104 is the same as content on the active coordinator node 102.

Embodiment 4

Figure 10:
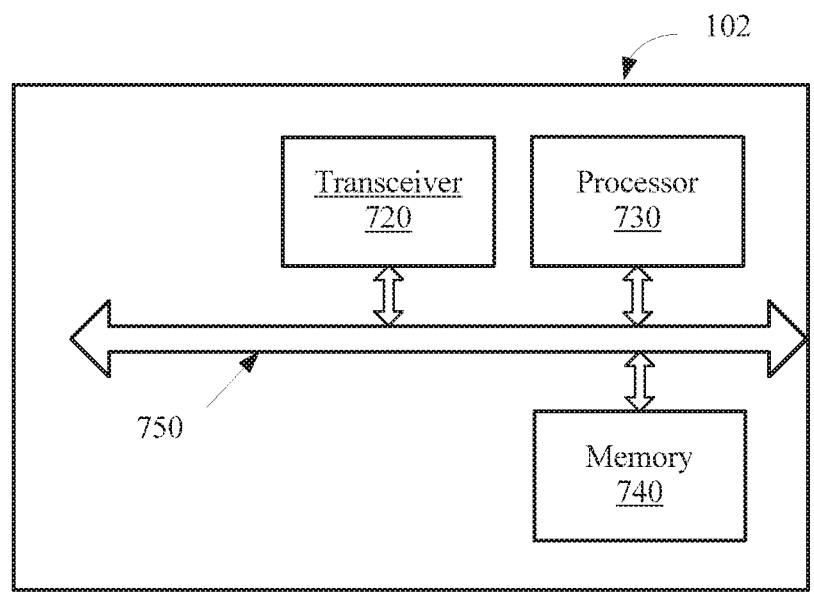
FIG. 10 is a schematic structural diagram of an active coordinator node applied to a database cluster according to an embodiment of the present application.

FIG. 10 is a schematic structural diagram of an active coordinator node 102 in FIG. 1 or an active coordinator node 600 in FIG. 6 to FIG. 9 applied to a database cluster according to a sixth embodiment of the present application. It should be noted that the active coordinator node 102 and the active coordinator node 600 are a same object described from different perspectives, and their internal structures are the same. The following uses the active coordinator node 102 as an example for description. The active coordinator node 102 includes a transceiver 720, a processor (CPU) 730, a memory 740, and a bus 750. The transceiver 720 is configured to receive a transaction log sent by each processing node in the database cluster system. The transaction log is a database log that records a corresponding transaction. Specifically, the transceiver 720 is configured to receive, by using a high-speed network, the transaction log sent by the processing node in the database system. The high-speed network refers to a network whose transmission delay is not greater than a nanosecond (ns) level transmission delay. For example, the high-speed network is an IB network.

The transceiver 720 is configured to obtain status information corresponding to each processing node in multiple processing nodes, where the status information is used to indicate an operating load status of the processing node.

The processor 730 is configured to determine, according to the status information corresponding to each processing node in the multiple processing nodes, whether the active coordinator node has an idle resource whose capacity is a preset threshold X. If the active coordinator node has the idle resource whose capacity is the preset threshold X, the transceiver 720 instructs each processing node to upload subsequently generated clean page data to the active coordinator node.

In another optional embodiment, the processor 730 determines, according to the status information corresponding to each processing node in the multiple processing nodes, whether the active coordinator node has an idle resource whose capacity is a preset threshold X. If the active coordinator node has the idle resource whose capacity is the preset threshold X, the processor 730 is further configured to determine, according to the status information corresponding to each processing node in the multiple processing nodes, whether each processing node in the multiple processing nodes is to upload dirty page data whose data volume is less than the preset threshold X within a preset time period.

If each processing node in the multiple processing nodes is to upload the dirty page data whose data volume is less than the preset threshold X within the preset time period, the transceiver 720 instructs each processing node to upload subsequently generated clean page data to the active coordinator node.

in still another optional embodiment, after the transceiver 720 instructs each processing node to upload the subsequently generated clean page data to the active coordinator node, the processor 730 is further configured to monitor the idle resource of the active coordinator node in real time. When the capacity of the idle resource of the active coordinator node is less than a preset threshold Z, the transceiver 720 instructs each processing node not to upload the generated clean page data to the active coordinator node any more, where Z is less than X.

After each processing node is instructed not to upload the generated clean page data to the active coordinator node any more, and if the active coordinator node receives newly generated dirty page data, the processor 730 is further configured to preferably remove the clean page data cached on the memory 740 of the active coordinator node.

Alternatively, if the active coordinator node receives newly generated dirty page data, and a data volume of the newly generated dirty page data is greater than a data volume of the clean page data cached on the active coordinator node, the processor 730 is further configured to preferably remove the clean page data cached on the memory 740 of the active coordinator node, and store the newly generated dirty page data in a storage device (a shared storage disk) of the database cluster.

In yet another optional embodiment, whether each processing node in the multiple processing nodes is to upload dirty page data whose data volume is less than the preset threshold X within a preset time period is determined according to the status information corresponding to each processing node in the multiple processing nodes. If each processing node in the multiple processing nodes is to upload the dirty page data whose data volume is less than the preset threshold X within the preset time period, the processor 730 is further configured to generate a cache policy of the active coordinator node according to the status information corresponding to each processing node in the multiple processing nodes. The cache policy of the active coordinator node includes a policy for uploading clean page data by each processing node in the multiple processing nodes to the active coordinator node. The transceiver 720 instructs each processing node to upload subsequently generated clean page data to the active coordinator node 102 according to the cache policy of the active coordinator node.

in the active coordinator node 102, the bus 750 is used for communication between the processor 730, the transceiver 720, and the memory 740.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is disclosed above is merely examples of embodiments of the present application, and certainly is not intended to limit the protection scope of the present application. Therefore, equivalent variations made in accordance with the claims of the present application shall fall within the scope of the present application.

What is claimed is:

1. A resource coordination method for a database cluster, wherein the database cluster comprises a plurality of processing nodes and an active coordinator node, the method comprising:
   obtaining status information corresponding to each processing node, wherein the status information is used to indicate an operating load status of the processing node;
   determining, according to the status information, when the active coordinator node has an idle resource whose capacity is a preset threshold X; and either
   instructing each processing node to upload subsequently generated clean page data to the active coordinator node; or
   determining, according to the status information corresponding to each processing node in the plurality of processing nodes, when each processing node is to upload dirty page data whose data volume is less than the preset threshold X within a preset time period, and when each processing node is to upload the dirty page data whose data volume is less than the preset threshold X within the preset time period, instructing each processing node to upload subsequently generated clean page data to the active coordinator node.

2. The method according to claim 1, wherein after instructing each processing node to upload subsequently generated clean page data to the active coordinator node, the method further comprises:
   monitoring the idle resource of the active coordinator node in real time; and
   instructing, when the capacity of the idle resource of the active coordinator node is less than a preset threshold Z, each processing node not to upload the generated clean page data to the active coordinator node any more, wherein Z is less than X.

3. The method according to claim 2, wherein after instructing each processing node not to upload the generated clean page data to the active coordinator node any more, the method further comprises removing the clean page data cached on the active coordinator node when the active coordinator node receives newly generated dirty page data.

4. The method according to claim 2, wherein after instructing each processing node not to upload the generated clean page data to the active coordinator node any more, wherein the active coordinator node receives newly generated dirty page data, and wherein a data volume of the newly generated dirty page data is greater than a data volume of the clean page data cached on the active coordinator node, the method further comprises:
    removing the clean page data cached on the active coordinator node; and
    storing the newly generated dirty page data in a storage device of the database cluster.

5. The method according to claim 1, wherein after determining that each processing node in the multiple processing nodes is to upload the dirty page data whose data volume is less than the preset threshold X within the preset time period, the method further comprises generating a cache policy of the active coordinator node according to the status information corresponding to each processing node, wherein the cache policy of the active coordinator node comprises a policy for uploading clean page data by each processing node in the multiple processing nodes to the active coordinator node, and wherein instructing each processing node to upload subsequently generated clean page data to the active coordinator node comprises instructing each processing node to upload the subsequently generated clean page data to the active coordinator node according to the cache policy of the active coordinator node.

6. The method according to claim 5, wherein generating the cache policy of the active coordinator node comprises:
    calculating, according to the status information corresponding to each processing node, a proportion of dirty page data generated by each processing node in a current unit of time; and
    generating the cache policy of the active coordinator node according to the proportion of the dirty page data generated by each processing node in the current unit of time.

7. An active coordinator node for a database cluster, comprising:
    a high-speed network channel configured to communicate with a plurality of processing nodes in the database cluster; and
    a processor coupled to the high-speed network channel, the processor configured to:
        obtain status information corresponding to each processing node in a plurality of processing nodes, wherein the status information is used to indicate an operating load status of the processing node;
        determine, according to the status information corresponding to each processing node, when the active coordinator node has an idle resource whose capacity is a preset threshold X;
        determine, according to the status information corresponding to each processing node, when each processing node is to upload dirty page data whose data volume is less than the preset threshold X within a preset time period when the active coordinator node has the idle resource whose capacity is the preset threshold X; and
        instruct each processing node to upload subsequently generated clean page data to the active coordinator node when a determining result of the first determining module is that the active coordinator node has the idle resource whose capacity is the preset threshold X.

8. The active coordinator node according to claim 7, wherein the processor is further configured to:
    monitor the idle resource of the active coordinator node in real time; and
    instruct, when the capacity of the idle resource of the active coordinator node is less than a preset threshold Z, each processing node not to upload the generated clean page data to the active coordinator node any more, wherein Z is less than X.

9. The active coordinator node according to claim 8, wherein the processor is further configured to remove the clean page data cached on the active coordinator node after instructing each processing node not to upload the generated clean page data to the active coordinator node anymore and when the active coordinator node receives newly generated dirty page data.

10. The active coordinator node according to claim 8, wherein the processor is further configured to, after the execution module instructs each processing node not to upload the generated clean page data to the active coordinator node any more, when the active coordinator node receives newly generated dirty page data, and when a data volume of the newly generated dirty page data is greater than a data volume of the clean page data cached on the active coordinator node,
    remove the clean page data cached on the active coordinator node; and
    store the newly generated dirty page data in a storage device of the database cluster.

11. The active coordinator node according to claim 7, wherein after determining that each processing node is to upload dirty page data whose data volume is less than the preset threshold X within a preset time period when the active coordinator node has the idle resource whose capacity is the preset threshold X, the processor is further configured to:
    generate a cache policy of the active coordinator node according to the status information corresponding to each processing node in the multiple processing nodes, wherein the cache policy of the active coordinator node comprises a policy for uploading clean page data by each processing node in the multiple processing nodes to the active coordinator node; and
    instruct each processing node to upload subsequently generated clean page data to the active coordinator node according to the cache policy of the active coordinator node.

12. The active coordinator node according to claim 11, wherein the processor is further configured to:
    calculate, according to the status information corresponding to each processing node, a proportion of dirty page data generated by each processing node in a current unit of time; and
    generate the cache policy of the active coordinator node according to the proportion of the dirty page data generated by each processing node in the current unit of time.

13. A database cluster, comprising:
    a plurality of processing nodes;
    an active coordinator node; and
    a high-speed network channel coupling the active coordinator node with the plurality of processing nodes,
    wherein the active coordinator node is configured to:
        obtain status information corresponding to each processing node;
        determine, according to the status information corresponding to each processing node, when the active coordinator node has an idle resource whose capacity is a preset threshold X;

instruct each processing node to upload subsequently generated clean page data to the active coordinator node; or determine, according to the status information corresponding to each processing node in the multiple processing nodes, when each processing node in the multiple nodes is to upload dirty page data whose data volume is less than the preset threshold X within a preset time period, and, instruct each processing node to upload subsequently generated clean page data to the active coordinator node, wherein the status information is used to indicate an operating load status of the processing node, and wherein each processing node is configured to:

receive an instruction sent by the active coordinator node; and upload the generated clean page data to the active coordinator node when any one of the processing nodes generates clean page data.

14. The database cluster according to claim 13, wherein the active coordinator node is further configured to:

generate a cache policy of the active coordinator node according to the status information corresponding to each processing node; and instruct each processing node to upload the subsequently generated clean page data to the active coordinator node according to the cache policy of the active coordinator node, and wherein each processing node is further configured to:

receive the instruction sent by the active coordinator node; and upload, when any one of the processing nodes generates clean page data, the generated clean page data to the active coordinator node according to the cache policy of the active coordinator node.

15. The database cluster according to claim 13, wherein the database cluster further comprises a standby coordinator node, wherein in the standby coordinator node is configured to back up data for the active coordinator node so that content on the standby coordinator node is the same as content on the active coordinator node.

16. A resource coordination method for a database cluster, wherein the database cluster comprises a plurality of processing nodes and an active coordinator node, the method comprising:

obtaining status information corresponding to each processing node, wherein the status information is used to indicate an operating load status of the processing node; and instructing, when the active coordinator node has the idle resource whose capacity is the preset threshold X, each processing node to upload subsequently generated clean page data to the active coordinator node; and instructing, when each processing node in the multiple processing nodes is to upload the dirty page data whose data volume is less than the preset threshold X within the preset time period, each processing node to upload subsequently generated clean page data to the active coordinator node.

17. The method according to claim 16, wherein after instructing each processing node to upload subsequently generated clean page data to the active coordinator node, the method further comprises:

monitoring the idle resource of the active coordinator node in real time; and instructing, when the capacity of the idle resource of the active coordinator node is less than a preset threshold Z, each processing node not to upload the generated clean page data to the active coordinator node any more, wherein Z is less than X.

18. The method according to claim 17, wherein after instructing each processing node not to upload the generated clean page data to the active coordinator node any more, the method further comprises removing, when the active coordinator node receives newly generated dirty page data, the clean page data cached on the active coordinator node.

19. The method according to claim 17, wherein after instructing each processing node not to upload the generated clean page data to the active coordinator node any more, wherein when the active coordinator node receives newly generated dirty page data, and wherein when a data volume of the newly generated dirty page data is greater than a data volume of the clean page data cached on the active coordinator node, the method further comprises:

removing the clean page data cached on the active coordinator node and storing the newly generated dirty page data in a storage device of the database cluster.

20. The method according to claim 16, wherein after instructing each processing node to upload dirty page data, the method further comprises generating a cache policy of the active coordinator node according to the status information corresponding to each processing node, wherein the cache policy of the active coordinator node comprises a policy for uploading clean page data by each processing node to the active coordinator node, and wherein instructing each processing node to upload subsequently generated clean page data to the active coordinator node comprises instructing each processing node to upload the subsequently generated clean page data to the active coordinator node according to the cache policy of the active coordinator node.

* * * * *